US012151900B2

(12) United States Patent
Marchesini

(10) Patent No.: US 12,151,900 B2
(45) Date of Patent: Nov. 26, 2024

(54) TRANSPORT DEVICE, TRANSPORT METHOD AND SYSTEM FOR RECLAIMING AGGREGATES

(71) Applicant: WAMGROUP S.P.A., Modena (IT)

(72) Inventor: Vainer Marchesini, San Prospero (IT)

(73) Assignee: WAMGROUP S.P.A., Modena (IT)

( * ) Notice: Subject to any disclaimer, the term of this patent is extended or adjusted under 35 U.S.C. 154(b) by 0 days.

(21) Appl. No.: 17/905,884

(22) PCT Filed: Mar. 11, 2021

(86) PCT No.: PCT/IB2021/052051
§ 371 (c)(1),
(2) Date: Sep. 8, 2022

(87) PCT Pub. No.: WO2021/181335
PCT Pub. Date: Sep. 16, 2021

(65) Prior Publication Data
US 2023/0122448 A1    Apr. 20, 2023

(30) Foreign Application Priority Data
Mar. 11, 2020    (IT) .................. 102020000005155

(51) Int. Cl.
*B65G 33/16*    (2006.01)
*B65G 33/14*    (2006.01)

(52) U.S. Cl.
CPC ............. *B65G 33/16* (2013.01); *B65G 33/14* (2013.01); *B65G 2201/045* (2013.01); *B65G 2207/24* (2013.01); *B65G 2812/0555* (2013.01)

(58) Field of Classification Search
CPC ................... B65G 33/16; B65G 33/14; B65G 2812/0555; B65G 2812/0522; B65G 2201/045; B65G 2207/24

(Continued)

(56) References Cited

U.S. PATENT DOCUMENTS 2,697,510 A * 12/1954 Morrison ............... B65G 33/08
198/659
3,307,683 A * 3/1967 Pleasants ............... B65G 33/00
29/889

(Continued)

FOREIGN PATENT DOCUMENTS

CN    104590832 A  *  5/2015    ............. B65G 33/14
DE    4135999 A1    5/1993

(Continued)

*Primary Examiner* — James R Bidwell
(74) *Attorney, Agent, or Firm* — Pearne & Gordon LLP; J. Gregory Chrisman

(57) ABSTRACT

A transport device for conveying a flowable material, comprises a screw conveyor for collecting the fluid from a collecting zone and transporting the fluid to a destination zone. The screw conveyor comprises a spiral which is wound around a shaft extending along a longitudinal axis and an outer casing which at least partly houses the spiral. The spiral has a plurality of turns. The outer casing has an inner surface facing respective head surfaces of at least some turns. Between two consecutive turns and the outer casing there is a compartment. The outer casing is made at least partly from a deformable polymeric material in such a way that the outer casing deforms radially and reversibly towards the outside when a solid particle of the flowable material conveyed by the spiral is interposed between a head surface of one turn and the inner surface of the outer casing, to allow the solid particle to be transferred from one compartment to a further compartment adjacent to said compartment passing between the head surface of the turn and the inner surface of the outer casing.

18 Claims, 4 Drawing Sheets

(58) Field of Classification Search
USPC .................................................. 198/658, 659
See application file for complete search history.

(56) References Cited

U.S. PATENT DOCUMENTS

| | | |
|---|---|---|
| 3,360,108 A | 12/1967 | Voss |
| 3,802,551 A * | 4/1974 | Somers .................. B65G 33/16 198/662 |
| 3,967,722 A * | 7/1976 | Dietert ................. B65G 33/265 222/413 |
| 7,922,384 B2 * | 4/2011 | Voorthuysen .......... B65G 33/14 198/657 |
| 7,934,593 B2 | 5/2011 | Passerini et al. |
| 2010/0300844 A1 | 12/2010 | Passerini et al. |
| 2017/0312755 A1 | 11/2017 | Marchesini et al. |

FOREIGN PATENT DOCUMENTS

| | | | | |
|---|---|---|---|---|
| JP | 61-291312 | * | 12/1986 | ............. B65G 33/16 |
| WO | WO-2008147240 A1 | * | 12/2008 | ............. B65G 33/16 |
| WO | 2009047811 A1 | | 4/2009 | |
| WO | 2016079635 A1 | | 5/2016 | |

* cited by examiner

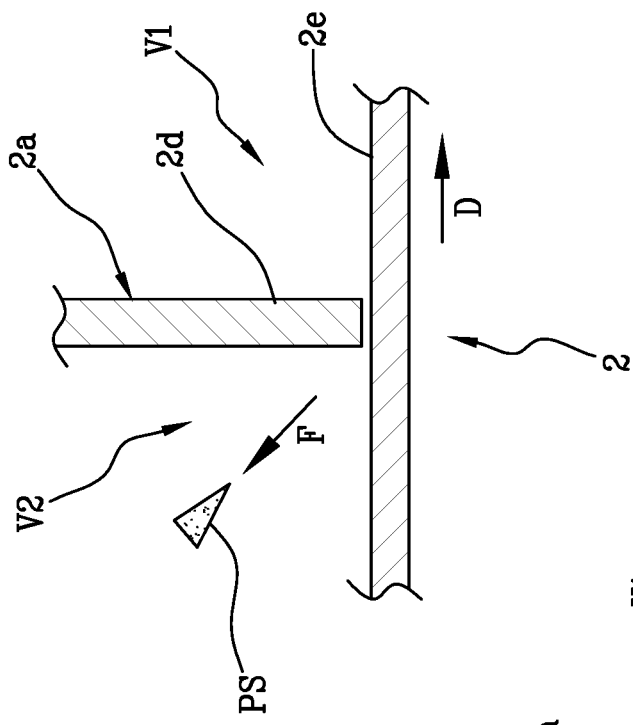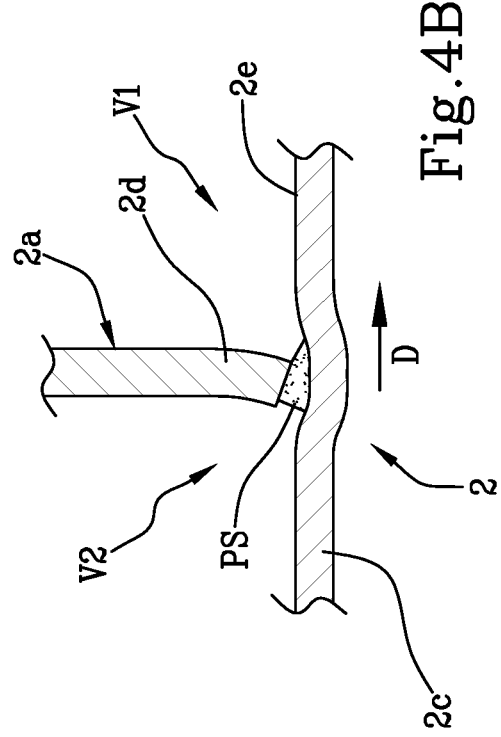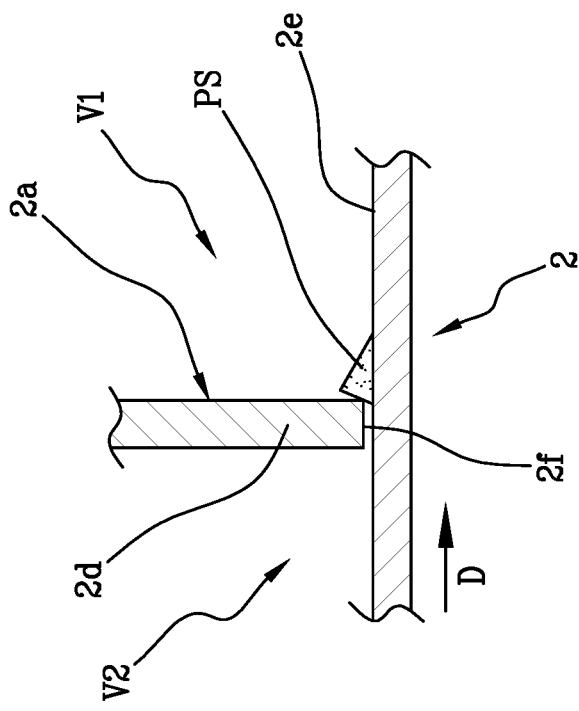

TRANSPORT DEVICE, TRANSPORT METHOD AND SYSTEM FOR RECLAIMING AGGREGATES

This invention relates to a transport device and a method for transporting a flowable material.

The flowable material which can be transported by the device and method according to the invention may be a fluid containing a liquid fraction and a solid fraction. The fluid may comprise, in particular, a liquid inside of which there are solid particles having dimensions different to each other, for example a fluid comprising water inside of which residues of concrete are dispersed.

Alternatively, the fluid which can be transported by the device and method according to the invention may be a loose solid material, that is to say, containing powder and/or granules and/or flakes having dimensions different to each other.

The device and the method according to the invention can in particular be used for sending a fluid comprising a liquid inside of which there are concrete residues towards a concrete separator, for reclaiming the aggregate materials dispersed in the liquid. This liquid may come from truck mixers arranged to prepare the concrete and transport it to a construction site, or from production plants for prefabricated concrete products.

Moreover, the invention relates to a system for reclaiming aggregates of concrete residues comprising the above-mentioned transport device.

Separating apparatuses are known, which are also called concrete separators, which allow the aggregates to be reclaimed from excess quantities of concrete which remain unused on the truck mixers, or from washing fluids with which the truck mixers or other equipment which handle the concrete are washed.

Numerous truck mixers which during the day distribute concrete on construction sites transit in a system for reclaiming aggregates. In the evening, once the operations for transporting concrete to the construction sites have come to an end, the truck mixers have to be cleaned so as to be freed of the concrete residues present inside them.

The truck mixers are therefore subjected to washing operations, during which the concrete is diluted in the truck mixer, by introducing inside the truck mixer a quantity of water usually with a 1:1 ratio with the concrete present in the truck mixer.

After completing the washing, each truck mixer discharges into a tank of a reclaiming system the remaining concrete contained in the truck mixer, diluted in the washing water.

The production plants for the production of prefabricated concrete elements comprise a concrete mixer and a plurality of carriages which receive the concrete from the mixer and transport it inside the plant for pouring it into suitable formwork.

At the end of the daily production cycle, the mixer and carriages are washed to remove the concrete residues that remain inside them. The liquid resulting from the washing operations, inside of which the concrete residues are contained, may be poured into a tank of a reclaiming system so that the residues can be reclaimed.

A transport device is in fluid communication with the tank of the reclaiming system. The transport device may be of the type disclosed in international patent application WO 2016/079635.

The transport device is activated for transporting the concrete and the water, that is to say, the fluid containing the aggregates to be reclaimed, from the tank to the separating apparatus. The transport device is generally equipped with a screw conveyor comprising a tubular casing and a spiral, housed in the casing. The spiral comprises a plurality of turns whose head surface is in contact with the inner surface of the tubular casing. In this way, the transport device is able to transport upwards not only solids but also water.

It may occur that a solid particle, for example a piece of gravel, jams between the spiral and the casing. If this occurs, there is a high risk of damaging the tubular casing or damaging the spiral. For example, the solid particle which becomes jammed between the spiral and the casing may scratch the inner surface of the tubular casing, or may permanently deform the tubular casing, or may create, on a surface covering of the tubular casing, a crack in which the liquid penetrates. In the latter case, the liquid, which is normally corrosive, may come into contact with materials which are not suitable for interacting with the liquid, thereby causing rusting phenomena and/or progressive widening of the crack. In the long run, this adversely affects the efficiency of the transport device.

Moreover, in order to allow the transport device to continue operating even if a solid particle jams between the spiral and the casing, a high installed power is required in order to deal with the power peaks necessary to disengage the solid particle. For this reason, the prior art systems are not very economically sustainable from an energy point of view. Moreover, another drawback of the prior art transport devices is due to the high noise level. For example, some prior art casings are made of a metallic material which, during transportation of the concrete residues, give rise to a very loud noise.

If the transport device is used to transport a liquid containing concrete residues, the characteristics of the solid fraction and of the liquid fraction of the material to be transported accentuate the critical aspects of the device which, more specifically, has to lift gravel, sand, chemical and liquid aggregates.

Similar drawbacks may occur when a transport device of the type described above is used to transport a loose material consisting of solid particles in the form of powder, and/or granules, and/or flakes having different dimensions.

WO 2009/047811, which has been filed by an applicant belonging to the same group as the applicant of the present application, discloses a transport device comprising a screw conveyor, inside an outer casing of which a spiral rotates, powered by a motor. The transport device further comprises an elastic cradle, which is interposed between the outer casing and the spiral and which can be made of a plastic material such as polyurethane. According to the disclosure of WO 2009/047811, the elastic cradle is helpful if aggregate material inserts between the spiral and the cradle. In this case, a slight elastic deformation occurs, which facilitates passage of the aggregate material.

The cradle disclosed in WO 2009/047811 has a plurality of ribs provided on a surface of the cradle facing the outer casing. The ribs rest on the outer casing.

When the transport device disclosed in WO 2009/047811 is used to transport aggregates, it happens that a solid particle jams between the cradle and the spiral. If the solid particle is trapped between the cradle and the spiral at a point of the cradle very close to a rib, in which the cradle has a relatively high stiffness due to the presence of the rib, the solid particle may cut the cradle and penetrate through the thickness of the cradle. This leads to rapid wear and breakage of the cradle, which worsens the efficiency of the transport device and may require that the transport device be stopped to replace the damaged cradle with a new one. The technical purpose of the invention is therefore to provide a transport device for a flowable material, a method for transporting a flowable material and a system for reclaiming aggregates which are able to overcome the drawbacks of the prior art.

An object of the invention is to improve the prior art transport devices for transporting a flowable material, for example a fluid comprising a solid fraction and a liquid fraction (such as a liquid comprising water inside of which residues of concrete are dispersed), or a loose material comprising solid particles in the form of powder, and/or granules, and/or flakes.

A further object is to reduce the risks of deforming and/or damaging the casing and/or the spiral in a prior art system, suitable for transporting a fluid comprising a liquid fraction and a solid fraction, in particular a liquid inside of which there are dispersed residues of concrete, or suitable for transporting a loose material comprising solid particles in the form of powder, and/or granules, and/or flakes.

Another object is to provide a transport device for transporting a flowable material, which allows the installed power to be reduced.

A further object is to provide a transport device for transporting a flowable material, which is able to operate with a reduced noise.

The technical purpose indicated and the objects specified are substantially achieved by a transport device, a transport method and a system for reclaiming aggregates comprising the technical features described in one or more of the appended claims. The dependent claims correspond to possible embodiments of the invention.

In a first aspect of the invention, there is provided a transport device for conveying a flowable material, the device comprising a screw conveyor for collecting the fluid from a collecting zone and transporting the fluid towards a destination zone, the screw conveyor comprising a spiral which is wound on a shaft extending along a longitudinal axis and a casing which houses at least partly the spiral, the spiral having a plurality of turns, the casing having an inner surface facing respective head surfaces of at least some turns of said plurality of turns, between two consecutive turns of said plurality of turns and the casing a compartment being defined, characterised in that the casing is made at least partly with a polymeric material deformable in such a way that the casing deforms radially and reversibly towards the outside when a solid particle of said flowable material, conveyed by the spiral, is interposed between a head surface of a turn of said plurality of turns and the inner surface of the casing, to allow said solid particle to be transferred from one compartment to a further compartment adjacent to said compartment by passing between the head surface of the turn and the inner surface of the casing.

Owing to the radial and reversible deformation of the casing, the solid particle, which would otherwise jam between the casing and the head surface of a turn, can easily pass into a further compartment adjacent to said compartment, for example into a further compartment which precedes said compartment, without damaging the spiral and/or the casing.

In an embodiment, the casing is an outer casing of the transport device.

By manufacturing the outer casing with a deformable polymeric material, so that the outer casing may deform radially and reversibly towards the outside when a solid particle of the flowable material, conveyed by the spiral, is interposed between a head surface of a turn and the inner surface of the casing, there is no need to use the elastic cradle disclosed in WO 2009/047811. In other words, no elastic cradle is interposed between the outer casing and the spiral, because the outer casing is directly facing the spiral.

The risk of damaging the component surrounding the spiral is therefore strongly reduced, because the outer casing can be free to expand radially, at least in an active transport zone in which the flowable material conveyed by the spiral is accumulated during transport. Hence, if a solid particle jams between the deformable outer casing and the spiral, the outer casing is free to deform towards the outside so that the solid particle may pass between the head surface of the spiral and the inner surface of the casing.

In other words, at least in the active zone, the outer casing is elastically yielding in a uniform manner, along a radial direction. In an embodiment, the turns of said plurality of turns are made of a deformable polymeric material, so as to be reversibly bent when a solid particle conveyed by the spiral is interposed between a head surface of a turn of said plurality of turns and the inner surface of the casing.

In an embodiment, the head surfaces of the turns of said plurality of turns are parallel to an inner surface of the casing, in such a way that the head surfaces perform, during rotation of the spiral, a sort of brushing action on the inner surface of the casing.

Owing to this brushing action, the spiral brushes the inner surface of the casing, whilst the spiral deforms elastically.

The casing also deforms elastically and, during the relative elastic return, synergically cooperates with the spiral to project the solid particle towards the centre of the adjacent compartment.

This makes it possible to avoid jamming, malfunctions and loss of efficiency of the transport device.

Since the casing and/or the spiral, after their instantaneous deformation, rapidly recover their initial shape, it is possible to restore substantially immediately contact between the head surface of the turns and the inner surface of the casing. This contact remains unaltered over time, which allows the efficiency of the transport device to be maintained high over time, even and especially if the longitudinal axis of the transport device is tilted, that is to say, the transport device allows the flowable material to be transported from a lower collecting zone to a higher destination zone. In effect, by keeping the casing constantly in contact with the head surface of the turns, it is possible to prevent any liquid fraction of the flowable material from flowing backwards, which would worsen the efficiency of the transport device.

In a second aspect of the invention, there is provided a method comprising the steps of:
  introducing a flowable material in a collecting zone;
  providing a transport device comprising a screw conveyor including a spiral which is wound on a shaft extending along a longitudinal axis and a casing which houses at least partly the spiral, the spiral having a plurality of turns, the casing having an inner surface facing respective head surfaces of at least some turns of said plurality of turns, a compartment being defined between two consecutive turns of said plurality of turns and the casing, the casing being made at least partly with a deformable polymeric material;
  transporting the fluid from the collecting zone to a destination zone by means of the transport device;
wherein, during the transporting step, the casing deforms locally, radially and reversibly towards the outside when a solid particle of said flowable material, which is conveyed by the spiral, is interposed between a head surface of a turn of said plurality of turns and the inner surface of the casing, so that said solid particle is transferred from a compartment to a further compartment adjacent to said compartment by passing between the head surface of the turn and the inner surface of the casing.

In an embodiment, there is provided a system for reclaiming aggregates from a flowable material consisting of a fluid containing residues of concrete, comprising a tank for containing said fluid in which the aggregates to be reclaimed are dispersed and a transport device according to the first aspect of the invention, wherein the screw conveyor is configured for collecting the fluid from the tank and transporting a liquid fraction of the fluid and the aggregates to be reclaimed from an upstream portion to a downstream portion of the screw conveyor.

Further features and advantages of the invention are more apparent in the non-limiting description which follows of a non-exclusive embodiment of a transport device, a transport method and a system for reclaiming aggregates.

The description is set out below with reference to the accompanying drawings which are provided solely for purposes of illustration without restricting the scope of the invention and in which:

FIGS. 4A-4C are a schematic representations of an operation of the transport device according to the invention.

With reference to the accompanying drawings, the numeral 1 denotes in its entirety a transport device for transporting concrete residues which, for simplicity of description, will hereafter be referred to as device 1.

The device 1 comprises a screw conveyor 2 for transporting a flowable material, collected from a collecting zone "P".

In the example shown, the flowable material comprises a fluid containing concrete residue.

More specifically, the fluid comprises a liquid fraction (for example, water) and a solid fraction consisting mainly of aggregates (sand and gravel). The solid fraction may also comprise, in addition to the above-mentioned aggregates, detritus formed by deposits of material deriving from the solidification of the concrete, or chippings of solidified material. More generally speaking, the solid fraction comprises solid particles which will hereinafter be referred to as "PS".

The screw conveyor 2 is configured for collecting the fluid from the collecting zone "P" which may, for example, comprise a tank 3 wherein one or more truck mixers discharge the fluid contained inside a drum of the truck mixer. Alternatively, the fluid deriving from the washing of the components of a system for producing prefabricated concrete can be discharged into the tank 3.

The screw conveyor 2 is also configured for transporting the fluid towards a destination zone "S", wherein a separating apparatus (not illustrated) may be, for example, positioned, the separating apparatus being configured for separating the solid fraction from the liquid fraction of the fluid.

Figure 1:
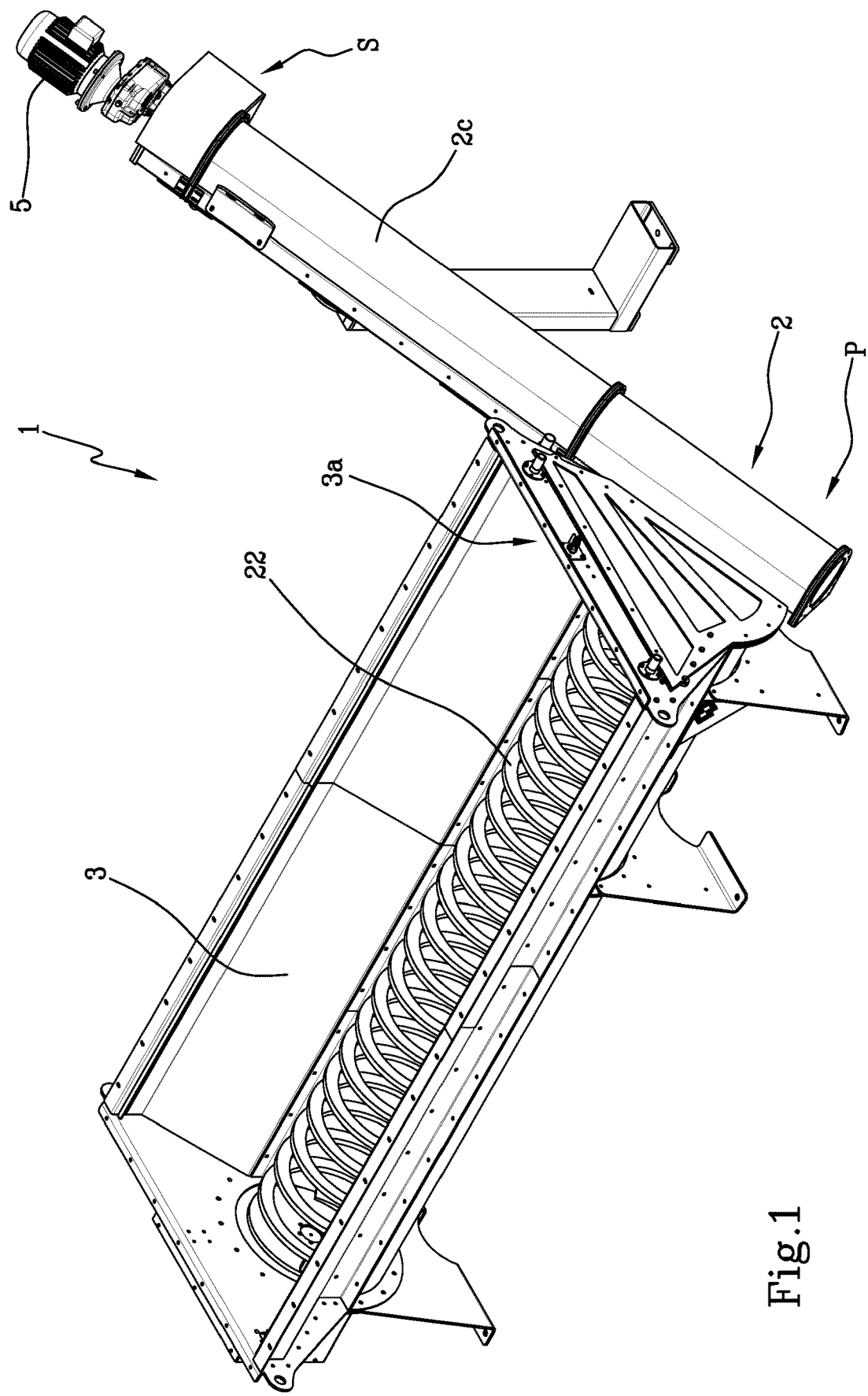
FIG. 1 is a schematic view of an apparatus comprising a transport device in a system for reclaiming aggregates.
Figure 2:
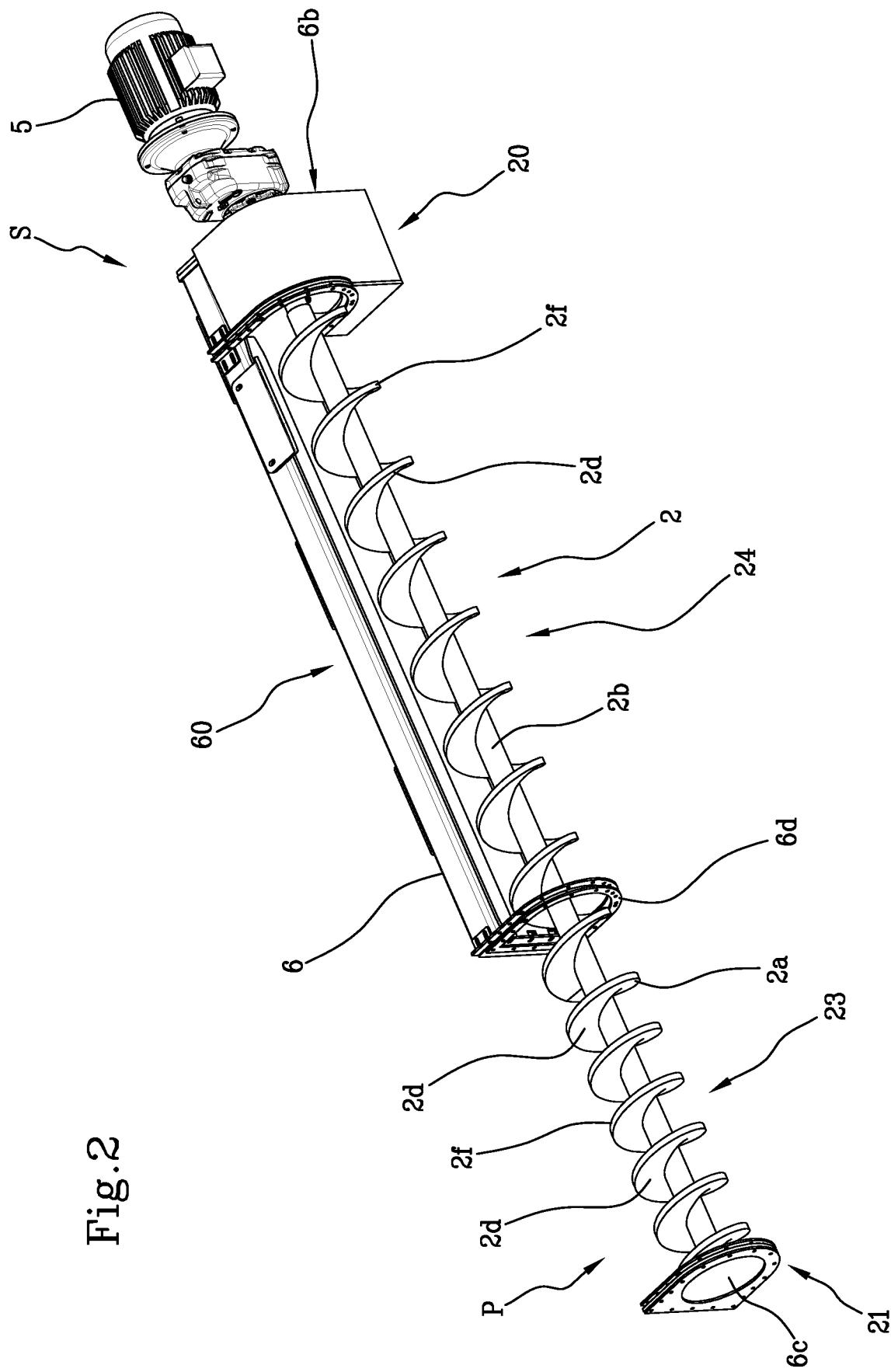
FIG. 2 is a perspective view showing some internal components of the transport device of FIG. 1.
Figure 3:
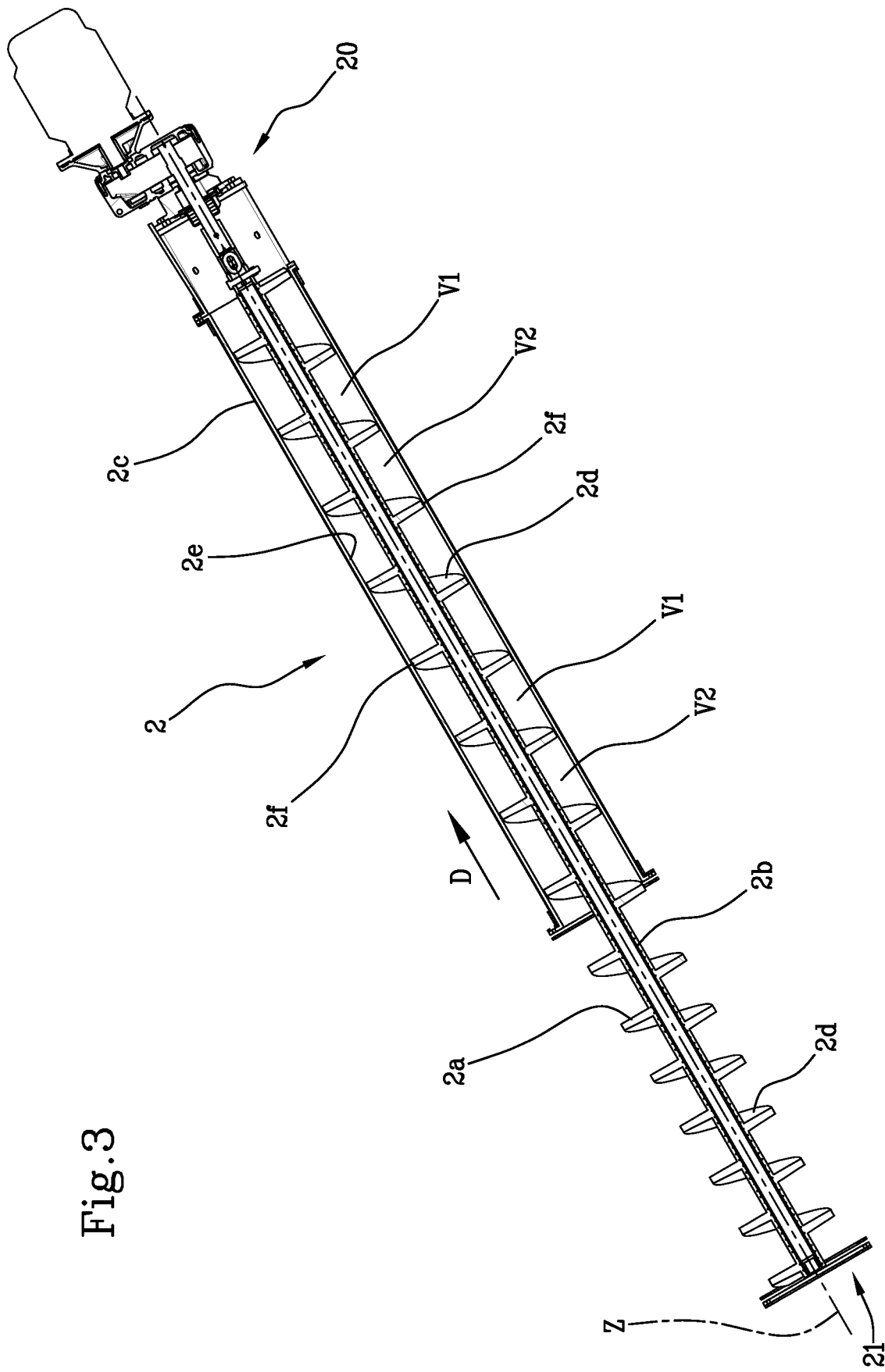
FIG. 3 is a schematic cross-section view of the transport device of FIG. 2.

As shown in FIGS. 2 and 3, the screw conveyor 2 comprises a spiral 2a which is wound around a shaft 2b, which extends along a longitudinal axis Z. The screw conveyor 2 further comprises an outer casing 2c inside of which the spiral 2a is at least partly housed. The term "at least partly housed" is to mean that the spiral 2a may also be housed only partly in the casing 2c both in a longitudinal direction and in a radial direction.

The shaft 2b is straight and extends from the collecting zone P to the destination zone S. The shaft 2b is rigid. In effect, the casing 2c may only house one longitudinal stretch of the spiral 2a, whilst a further longitudinal stretch of the spiral 2a projects outside the casing 2c. Alternatively to the above, or in addition to the above, the casing 2c may enclose the spiral 2a only for a predetermined angle about the longitudinal axis Z, leaving the spiral 2a uncovered over a remaining angle.

In the example shown, the casing 2c has a tubular shape in such a way as to define a radially closed channel inside of which the spiral 2a is housed, at least for a portion of the length thereof. The casing 2c is therefore delimited by an inner surface 2e which, in the example shown, is cylindrical.

In an alternative embodiment not illustrated, the casing 2c could have a "U"-shaped cross-section, that is to say, a transversal section open on one side.

The spiral 2a has a first end 20, suitable for being positioned in the destination zone "S", and a second end 21, opposite the first end 20, suitable for being positioned in the collecting zone "P". A motor 5, which may, for example, be located close to the destination zone "S" of the device 1, allows the spiral 2a to be rotated about the longitudinal axis Z. The motor 5 may be connected to the first end 20 of the spiral 2a.

In the example shown, the destination zone "S" is positioned at a higher level than the colleting zone "P". In this case, the longitudinal axis Z of the shaft 2b is tilted relative to a horizontal direction, that is to say, relative to the ground. In other words, the first end 20 of the spiral 2a is positioned at a higher level than the second end 21. In this case, the device 1 is suitable for transporting the fluid out of the tank 3, by lifting the fluid towards the destination zone S.

The spiral 2a has a plurality of turns 2d. The spiral 2a may have a variable pitch, in which case the distance between the turns 2d varies along the longitudinal axis Z of the shaft 2b, or have a constant pitch, in which case the distance between two consecutive turns 2d remains constant along the longitudinal axis Z of the shaft 2b.

If the spiral 2a has a variable pitch, the pitch may increase passing from the collecting zone "P" to the destination zone "S" (as shown, for example, in FIG. 2). In the spiral 2a there may be zones with different pitches, for example depending on the application for which the spiral 2a is designed.

In the example shown, the spiral 2a has a first portion with a constant pitch inside the casing 2c, and a second portion with a constant pitch upstream of the casing 2c, near the collecting zone "P". The pitch in the first portion is greater than the pitch in the second portion.

The screw conveyor 2 is configured for transporting towards the separating apparatus both the liquid fraction and the solid fraction of the fluid contained in the tank 3. For this purpose, the spiral 2a is housed inside the casing 2c in such a way that respective head surfaces 2f of the turns 2d of the spiral 2a are in direct contact with the casing 2c. In this way, it is possible to limit to negligible levels the quantity of liquid which is able to pass between the head surface 2f of a turn 2d and the casing 2c to return backwards towards the collecting zone "P" (if the conveyor 2 is positioned in such a way that the collecting zone "P" is arranged close to a lower zone of the device 1, as shown in the accompanying drawings).

In an embodiment, the spiral 2a and the casing 2c are in contact with each other at a predetermined angle about the shaft 2b on which the spiral 2a is wound.

The spiral 2a may be in contact with the inner surface 2e of the casing 2c through an angle of at least 180°.

In other words, the single head surfaces 2f of the turns 2d of the spiral 2a are in contact with the inner surface 2e of the casing 2c by a predetermined angle of contact, measured about the longitudinal axis Z of the shaft 2b. The contact angle may be, for example, 180°. In this way, it is possible to minimise the quantity of fluid which returns backwards (to the collecting zone "P") by passing between the head surfaces 2f of the turns 2d and the inner surface 2e.

For this purpose, the spiral 2a is in contact with the inner surface 2e of the casing 2c in an active transport zone in which the fluid conveyed is concentrated, when the spiral 2a rotates.

In effect, when the spiral 2a rotates about the longitudinal axis Z of the shaft 2b, the fluid transported is not distributed uniformly over an angle of 360° about the longitudinal axis Z of the shaft 2b, but is concentrated in an active transport zone having a predetermined angular extension about the longitudinal axis Z.

In the example shown, wherein—as already explained—the casing 2c has a tubular shape, the head surfaces 2f of the turns 2d face the inner surface 2e of the casing 2c over an angle of 360° about the longitudinal axis Z.

Moreover, as shown more clearly in FIGS. 4A-4C, the head surfaces 2f of the turns 2d are flat in cross-section and substantially parallel to the inner surface 2e of the casing 2c. Other geometries of the head surfaces 2f are in principle possible.

The device 1 further comprises a supporting structure 60, better visible in FIG. 2, for supporting the casing 2c. The supporting structure 60 may be arranged to support the casing 2c only on the side of the screw conveyor 2 facing towards the tank 3.

The supporting structure 60 may comprise a supporting element 6, shaped, for example, like a flat plate, which may extend parallel to the longitudinal axis Z.

The supporting element 6 may be made of a metallic material.

The casing 2c may be supported by the supporting element 6, for example on the non-load-bearing side of the spiral 2a, that is to say, on the side of the spiral 2a opposite to the active transport zone in which the fluid is concentrated whilst the latter is transported towards the destination zone "S".

In the example shown, the supporting element 6 is positioned in a central stretch and in a final stretch of the screw conveyor 2. An initial stretch of the screw conveyor 2 is in fluid communication with the collecting zone "P" (that is to say, with the tank 3) for the inlet of the fluid containing the solid particles "PS". The supporting element 6 is not present in the initial stretch.

In an embodiment, the distance between the spiral 2a and the inner surface 2e of the casing 2c may be adjustable. In this way it is possible to move the casing 2c towards the spiral 2a, so as to bring the inner surface 2e of the casing 2c into contact with the head surfaces 2f of the spiral 2a.

In order to adjust the distance between the spiral 2a and the inner surfaces 2e of the casing 2c, it is possible to act close to the first end 20, that is to say, the highest end, of the spiral 2a.

In the example shown, the second end 21 of the spiral 2a, that is to say, its lower end, is left free to rest on the supporting structure 60, due to the effect of gravity. More specifically, the second end 21 of the spiral 20 rests on an end element 6c of the supporting structure 60.

The first end 20 of the spiral 2a is constrained in a fixed position, for example connected to the motor 5.

The supporting element 6, which supports the casing 2c, is located at an adjustable distance from the casing 2c, close to the first end 20. By regulating the distance of the casing 2c from the supporting element 6, it is possible to adjust the distance of the casing 2c from the spiral 2a, so as to ensure that the head surfaces 2f of the turns 2d are in contact with the inner surface 2e of the casing 2c, at least in the active transport zone in which the fluid is positioned during transport. This adjustment may be performed before the device 1 starts operating, that is, when the device 1 is installed, or after installation of the device 1, during subsequent maintenance operations, so as to correctly reposition the casing 2c even after wear on the casing 2c and/or on the spiral 2a has occurred.

The casing 2c is thus positioned relative to the spiral 2a without preloading the casing 2c against the spiral 2a. For example, the supporting structure 60 may comprise an end support 6b, shaped for example like a plate, arranged to support the casing 2c close to the first end 20 of the spiral 2a. The end support 6b may be fixed to the supporting element 6 by at least one fastening element, for example by screws. These screws, which are screwed onto the supporting element 6, can pass through respective slots made in the end support 6b, so as to make it possible to adjust the position of the end support 6b and of the casing fixed to it.

The above-mentioned slots therefore allow adjustment of the position of the spiral 2a in such a way that there is a substantially zero clearance between the portion of the spiral 2a transporting the fluid (in the active transport zone) and the inner surface 2e of the casing 2c.

The end support 6b may be made of a metallic material.

In the screw conveyor 2 it is possible to define a plurality of compartments, each of which is defined between two consecutive turns 2d of the spiral 2a, a portion of the inner surface 2e of the casing 2c and the shaft 2b. More specifically, FIG. 3 shows the reference numerals relating to two pairs of adjacent compartments, indicating one compartment with V1 and a further compartment with V2. The further compartment V2 is adjacent to the compartment V1, in particular it precedes the compartment V1 relative to a direction of transport D of the fluid along the screw conveyor 2.

The casing 2c is made of deformable polymeric material in such a way as to allow, locally, reversible radial deformation of the casing 2c towards an outer portion of it when a solid particle "PS", for example an aggregate, transported by the transport device 1, is positioned with interference between the head surface 2f of at least one of the turns 2d of the spiral 2a and the inner surface 2e of the casing 2c.

In other words, when a solid particle "PS" is positioned between a head surface 2f of one turn 2d and the inner surface 2e of the casing 2c, the casing 2c deforms locally, that is to say, in the region where the solid particle "PS" is present, in an approximately radial direction and towards the outside. This allows the solid particle "PS" to pass between the head surface 2d and the inner surface 2e, so as to be transferred from one compartment V1, from which the solid particle "PS" comes, to a further compartment V2 adjacent to the compartment V1. More specifically, the further compartment V2 precedes the compartment V1 relative to the transport direction D.

For example, the deformable polymeric material from which the casing 2c is made is polyurethane. Thus, if a solid particle jams between the head surface 2f of a turn 2d of the spiral 2a and the inner surface 2e of the casing 2c, the latter deforms, widening radially, and lets the solid particle "PS" pass. The solid particle "PS" thus moves from the compartment V1 to the further compartment V2 and is thus moved away from the outer surface 2e of the casing 2c. In this way, the solid particle "PS" returns to a position closer to the shaft 2b, in which the solid particle "PS" can be correctly transported by the spiral 2a.

After the solid particle "PS" has been transferred to the further compartment V2, the casing 2c returns to its initial configuration, without undergoing permanent deformations. Alternatively, the deformable polymeric material from which the casing 2c is made may be another plastic material reversibly compliant with features similar to those of polyurethane, for example polyethylene.

Owing to the reversible radial deformability, it is possible to obtain a casing 2c (that is to say, a screw conveyor 2) having a non-significant permanent deformation, greater durability of the casing 2c, as well as a smaller abrasion of the casing 2c by the solid particles.

In the example shown, also the spiral 2a is made of a deformable polymeric material, which may be the same material from which the casing 2c is made, or a material different from that of the casing 2c. More specifically, the spiral 2a may be made of polyurethane, or from another deformable polymeric material, for example polyethylene, More in detail, the turns 2d are made entirely with the deformable polymeric material. The shaft 2b, on the other hand, is made of a metallic material, to give the screw conveyor 2 a sufficient torsional rigidity.

In this way, the spiral 2a (or, more precisely, a relative turn 2d) is able to reversibly deform when a solid particle "PS", transported by the device 1, is interposed between a turn 2d and the inner surface 2e of the casing 2c. In particular, the turn 2d may bend backwards relative to the transport direction D.

In this way, if a solid element jams between the head surface 2f of a turn 2d of the spiral 2a and the inner surface 2e of the casing 2c, the turn 2d bends and, owing to the simultaneous deformation of the casing 2c, lets pass the particle "PS" which is transferred from the compartment V1 to the further compartment V2.

FIGS. 4A-4C schematically show the passage of the solid particle "PS" from one compartment V1 to a further compartment V2. More specifically, FIG. 4A shows the solid particle "PS" which is in the compartment V1 and jams between the head surface 2f of a turn 2d and the inner surface 2e. FIG. 4B shows that the casing 2c locally deforms towards the outside and, simultaneously, the turn 2d bends. This allows the solid particle "PS" to pass from the compartment V1 to the previous further compartment V2, as shown in FIG. 4C.

When the turn 2d returns to the non-deformed configuration, it applies to the solid particle "PS" a propulsive force which pushes the solid particle "PS" towards the shaft 2b, as indicated by the arrow F in FIG. 4C. This prevents the solid particle "PS" from jamming again between the casing 2c and the spiral 2a.

The propulsive force applied by the turn 2d is generated in a particularly effective manner when the turn 2d is made entirely of elastically deformable material. If the turn 2d were made of a compliant material only close to the head surface 2f, it would be more difficult for the turn 2d to bend so as to project the solid particle "PS" towards the shaft 2b.

The deformation of the spiral 2a may occur simultaneously with the deformation of the casing 2c. Thus, at the same time, there are two deformations in the opposite direction, that is to say, the turn 2d deforms, bending towards the shaft 2b and the casing 2c deforms, becoming wider away from the shaft 2b. These two deformations collaborate in synergy in projecting the solid particle "PS" towards the longitudinal axis Z in a particularly efficient manner.

The deformation is limited only to the zone where the solid particles "PS" pass. In the remaining zones the spiral 2a and the casing 2c continue to transport the fluid without deforming.

It may occur that, when the machine for reclaiming the components of the concrete is stationary, the concrete in the device 1 sediments and hardens on the surface of the spiral 2a.

In this case, the deformation of the casing 2c and/or of the spiral 2a when the screw conveyor 2 restarts makes it possible to rapidly detach from the casing 2c and/or from the spiral 2a pieces of concrete left attached to the screw conveyor 2. These pieces can be conveyed to the destination zone "S" to be reclaimed.

The supporting structure 60 may further comprise an intermediate supporting flange 6d, arranged to support the casing 6c in an intermediate region thereof, in particular in a zone of passage between a loading portion 23 of the screw conveyor 2 and a transporting portion 24 of the screw conveyor 2. In the loading portion 23, the screw conveyor 2 receives the fluid from the tank 3, whilst in the transporting portion 24 the screw conveyor 2 carries the fluid out of the tank 3.

The casing 2c is free to deform radially towards the outside at least in a major portion of its length along the axis Z. For example, the outer casing 2c is free to deform radially towards the outside along more than half of its length along the axis Z. To be precise, the outer casing is free to deform radially towards the outside in a portion of the outer casing in which the supporting structure 60 is not present.

More specifically, the outer casing is free to deform radially towards the outside in an active transport zone in which the flowable material to be transported is accumulated during transport. The active transport zone may be opposite the supporting element 6 of the supporting structure 60, that is to say, located in a diametrically opposite position to the supporting element 6 relative to the axis Z.

It should be noted that the casing 2c is free of ribs or stiffening elements in a region thereof opposite to the supporting element 6, that is to say, in the active transport zone in which the fluid is concentrated during transport. This avoids having, in the active transport zone, parts of different compliance, which could adversely affect the operation of the screw conveyor 2.

A device 1 such as that described above allows to transport solid materials with variable grain size (with or without the presence of liquids), or to transport only liquids (if there is no longer solid material to be transported or if the system in which the transport device 1 is installed normally transports liquid in which accidentally solid elements may be present).

Moreover, owing to the deformability of the casing 2c, it is possible to install in the device 1 a motor 5 with reduced power compared with those used in prior art devices, which allows a reduced energy consumption and a consequent energy saving during the working hours.

It should be noted that if the deformable polymeric material is polyurethane, the concrete has poor adhesion to this material, since polyurethane is a highly apolar material with anti-adhesive properties.

Further, polyurethane is a flexible material, and even if the concrete adheres to the inner surface 2e or to the spiral 2a, the deposits of concrete rest on a compliant surface which on restarting the machine causes the breakage and the consequent ejection of the deposits.

The invention further relates to a method for transporting concrete residues. The method comprises the steps of providing a transport device 1 such as that described above (according to one or more of the embodiments).

The method therefore comprises filling a collecting zone "P" with a fluid, such as a liquid (for example, water) in which a solid fraction (for example, the aggregates "I", that is, concrete residues) is dispersed.

At this point, the method comprises transporting the fluid from the collecting zone "P" to a separating apparatus 4 (that is, to a destination zone "S") by using the above-mentioned device 1.

If, during the transporting step, a solid particle "PS" is arranged between the head surface 2f of at least one turn 2d of the spiral 2a and the inner surface 2e of the casing 2c, the method comprises a step of reversible radial deformation of the casing 2c of the device 1 (that is to say, of the screw conveyor 2), as schematically shown in FIG. 4B. In this way it is possible to transfer a solid particle "PS" from a compartment V1 (FIG. 4A), defined between two turns 2d and the casing 2c, to a further compartment V2, which precedes the compartment V1 relative to a transport direction D of the fluid by the screw conveyor 2 (FIG. 4C).

The method may further comprise a step of reversibly deforming the spiral 2a (as schematically illustrated in FIG. 4B) of the device 1 if during the transport step an aggregate is arranged with interference between the head surface 2f of at least one turn 2d of the spiral 2a and the inner surface 2e of the casing 2c.

The step of reversibly deforming the spiral 2a may occur simultaneously with the step of reversibly deforming the casing 2c.

The method described improves the efficiency of transport. Moreover, the method allows the wear of the casing 2c of the conveyor 2 to be reduced and/or the wear of the spiral 2a to be reduced.

The invention also relates to a system for reclaiming and separating aggregates. The system comprises a tank 3 for containing a fluid comprising a liquid in which the aggregates to be reclaimed are dispersed, and a transport device 1 such as that described above (according to one or more of the embodiments described). The screw conveyor 2 of the device 1 is configured for collecting the fluid from a collecting zone "P", defined by the tank 3, for example positioned on one side of the tank 3, and for transporting the liquid and the aggregates to be reclaimed from an upstream portion to a downstream portion of the screw conveyor 2. The fluid which is transported by the screw conveyor 2 towards the destination zone "S" has substantially the same composition as the fluid present in the tank 3, because the screw conveyor 2 allows transporting both the solid part and the liquid part of the fluid, without significant fractions of the liquid part flowing backwards. The tank 3 may be made of a metallic material, particularly sheet metal.

The tank 3 houses an auxiliary screw conveyor 22, suitable for moving the fluid, by causing the fluid to flow out of the tank 3 through a discharging zone 3a.

The tank 3 may be equipped with a filtering grille, not illustrated, near which a truck mixer or an operator can introduce the fluid into which the aggregates are dispersed. In other words, the tank 3 defines an inlet portion for introducing the concrete into the system. The transport device 1 is positioned laterally relative to the tank 3. In other words, the discharging zone 3a is positioned in a lateral portion of the tank 3 and the device 1 is in fluid communication with the tank 3 (that is, with the collecting zone "P") through the discharging zone 3a for introducing the flow into the screw conveyor 2.

The auxiliary screw conveyor 22 is positioned in the tank in such a way as to be connected or connectable to an upstream portion of the screw conveyor 2, thereby defining an "L" shape. In other words, the auxiliary screw conveyor 22 is substantially perpendicular to the screw conveyor 2 of the transport device and is connected or connectable by suitable mechanical connectors to the screw conveyor 2 close to the discharging zone 3a. Further, the tank 3 acts as a buffer in which the residues of concrete from the truck mixer can be stored, which can discharge into the tank 3 at the maximum permissible discharging speed without the operators having to worry how much material is actually treated. This makes it possible to speed up the unloading operations of the truck mixer. The system further comprises a separating apparatus configured to separate the aggregates from the fluid containing the concrete residues.

The separating apparatus is located downstream of the transport device 1, at the destination zone "S".

The separating apparatus is configured to act on the fluid transported by the transport device 1, separating from the fluid the larger aggregates (such as, for example, gravel), the smaller aggregates (such as, for example, sand) and the water, which may be subsequently recycled.

The invention is able to overcome the drawbacks of the prior art.

More specifically, the invention allows the deformation of the casing 2c and/or of the spiral 2a to be reduced or prevented, thereby reducing or preventing wear. Moreover, the invention allows the installed power to be reduced. The invention also makes it possible to reduce the overall noise level of the system during the working hours.

In conclusion, the invention allows the elements with a heterogeneous grain size and any liquids present to be transported without jamming and blocking of the elements between the spiral 2a and the casing 2c, thereby preventing permanent deformations and rapid wear of the spiral 2a and of the casing 2c.

The invention claimed is:

1. A transport device for conveying a flowable material, the device comprising a screw conveyor for collecting the flowable material from a collecting zone and transporting the flowable material towards a destination zone, a straight shaft extending along a longitudinal axis from the collecting zone to the destination zone, the screw conveyor comprising a spiral which is wound on the shaft and an outer casing which at least partially houses the spiral, the spiral having a plurality of turns, the outer casing having an inner surface facing respective head surfaces of at least some turns of said plurality of turns, a compartment being defined between two consecutive turns of said plurality of turns and the outer casing, wherein the outer casing is made at least partially with a deformable polymeric material in such a way that the outer casing deforms radially and reversibly towards the outside when a solid particle of said flowable material, conveyed by the spiral, is interposed between a head surface of a turn of said plurality of turns and the inner surface of the outer casing, in order to allow said solid particle to be transferred from one compartment to a further compartment adjacent to said compartment by passing between the head surface of the turn and the inner surface of the outer casing, and wherein the turns of said plurality of turns are made of a deformable polymeric material, so as to be reversibly bent when a solid particle conveyed by the spiral is interposed between a head surface of a turn of said plurality of turns and the inner surface of the outer casing.

2. The transport device according to claim 1, wherein the outer casing is free to deform radially towards the outside at least in an active transport zone in which the flowable material accumulates during transport.

3. The transport device according to claim 1, wherein the outer casing is free of ribs or stiffening elements.

4. The transport device according to claim 1, wherein the deformable polymeric material with which the outer casing is at least partially made is polyurethane.

5. The transport device according to claim 1, wherein the deformable polymeric material with which the turns of said plurality of turns are made is polyurethane.

6. The transport device according to claim 1, wherein the outer casing has a tubular shape to define a radially closed channel containing the spiral, at least for a portion of its length.

7. The transport device according to claim 1, and further comprising a supporting structure for supporting the outer casing, the supporting structure comprising a supporting element extending parallel to the longitudinal axis along a side of the outer casing.

8. The transport device according to claim 7, wherein the outer casing is free to deform radially towards the outside at least in an active transport zone in which the flowable material accumulates during transport, and wherein the active transport zone is located in a portion of the outer casing opposite the supporting element.

9. The transport device according to claim 7, wherein the shaft has a first end arranged in a fixed position and connected to a motor, and a second end, opposite the first end, resting on the supporting structure.

10. The transport device according to claim 7, wherein the outer casing is positioned at an adjustable distance from the supporting element for adjusting the position of the outer casing relative to the spiral, so that the inner surface of the outer casing can be brought into contact with the head surfaces of at least some turns of said plurality of turns.

11. The transport device according to claim 10, and further comprising at least one fastening element for fastening the outer casing in a fixed position relative to the supporting element once the distance between the supporting element has been adjusted.

12. The transport device according to claim 1, wherein said longitudinal axis is tilted so that the destination zone is positioned at a higher level than the collecting zone.

13. The transport device according to claim 1, wherein the spiral comprises a first portion located inside the outer casing and having a constant pitch, the spiral further comprising a second portion upstream of the first portion having a constant pitch, the pitch in the first portion being greater than the pitch in the second portion.

14. A method comprising the steps of:
introducing a flowable material into a collecting zone;
providing a transport device comprising a screw conveyor including a spiral which is wound on a shaft extending along a longitudinal axis and an outer casing which houses at least partially the spiral, the spiral having a plurality of turns, the spiral having an inner surface facing respective head surfaces of at least some turns of said plurality of turns, between two consecutive turns of said plurality of turns and the outer casing a compartment being defined, the outer casing being made at least partially with a deformable polymeric material;
transporting the flowable material from the collecting zone to a destination zone by using the transport device;
wherein, during the transporting step, the outer casing deforms radially and reversibly towards the outside when a solid particle of said flowable material, which is conveyed by the spiral, is interposed between a head surface of a turn of said plurality of turns and the inner surface of the outer casing, so that said solid particle is transferred from a compartment to a further compartment adjacent to said compartment by passing between the head surface of the turn and the inner surface of the outer casing; and
reversibly deforming at least one turn of said plurality of turns when, during the transporting step, a solid particle conveyed by the spiral is interposed between the head surface of said turn and the inner surface of the outer casing.

15. The method according to claim 14, wherein, when the solid particle is transferred from said compartment to said further compartment, the outer casing returns to a non-deformed configuration thereby projecting the solid particle towards the longitudinal axis.

16. The method according to claim 14, wherein, during the step of reversibly deforming at least one turn of the plurality of turns, said at least one turn bends and then returns to a non-deformed configuration, thereby projecting the solid particle towards the shaft.

17. A system for reclaiming aggregates from a flowable material consisting of a fluid containing residues of concrete, comprising a tank for containing said fluid in which the aggregates to be reclaimed are dispersed and a transport device according to claim 1, wherein the screw conveyor is configured to collect the fluid from the tank and transport a liquid fraction of the fluid and the aggregates to be reclaimed from a portion upstream to a portion downstream of the screw conveyor, the system further comprising a separating apparatus for separating the aggregates from the liquid fraction of the fluid, the separating apparatus being positioned downstream of the transport device.

18. The system according to claim 17, wherein the transport device is positioned laterally relative to the tank, the tank comprising an auxiliary screw conveyor for conveying the fluid towards said screw conveyor, the auxiliary screw conveyor being positioned in said tank in such a way as to define an "L" shape with the screw conveyor of the transport device.

* * * * *